United States Patent
Seiferth et al.

(10) Patent No.: US 11,983,017 B2
(45) Date of Patent: May 14, 2024

(54) METHOD FOR DETERMINING A MANEUVERING RESERVE IN AN AIRCRAFT, FLIGHT CONTROL DEVICE IN AN AIRCRAFT AND APPROPRIATELY EQUIPPED AIRCRAFT

(71) Applicant: Volocopter GmbH, Bruchsal (DE)

(72) Inventors: Christoph Seiferth, Stuttgart (DE); Johannes Stephan, Stuttgart (DE)

(73) Assignee: Volocopter GmbH, Bruchsal (DE)

( * ) Notice: Subject to any disclaimer, the term of this patent is extended or adjusted under 35 U.S.C. 154(b) by 472 days.

(21) Appl. No.: 17/380,229

(22) Filed: Jul. 20, 2021

(65) Prior Publication Data
US 2022/0043464 A1   Feb. 10, 2022

(30) Foreign Application Priority Data
Aug. 4, 2020 (DE) .......................... 102020120571.6

(51) Int. Cl.
G05D 1/00 (2024.01)
(52) U.S. Cl.
CPC ......... G05D 1/0825 (2013.01); G05D 1/0858 (2013.01); G05D 1/102 (2013.01)
(58) Field of Classification Search
None
See application file for complete search history.

(56) References Cited

U.S. PATENT DOCUMENTS

| 6,171,055 | B1 | 1/2001 | Vos et al. |
| 9,864,380 | B1 | 1/2018 | Ryan |

(Continued)

FOREIGN PATENT DOCUMENTS

| CN | 105473442 B | 4/2018 |
| CN | 111221346 A | 6/2020 |

(Continued)

*Primary Examiner* — Hongye Liang
(74) *Attorney, Agent, or Firm* — FIG. 1 Patents

(57) ABSTRACT

A method for determining a maneuvering reserve in an aircraft having a number of propulsion units, preferably a multirotor VTOL aircraft, most preferably an aircraft with electrically operated drive units for the rotors, including the steps: a) Determining a control vector, $\tau$, for the aircraft, $\tau=(L\ M\ N\ F)^T$, the components of which represent control torques of the aircraft around the roll axis, L, the pitch axis, M, and the yaw axis, N, and a total thrust, F, b) Approximating an existing four-dimensional control volume, D, of the aircraft by a four-dimensional ellipsoid, E, the axes of which represent the control torques, L, M, N, of the aircraft and the total thrust, F, c) Determining a normalized control vector, $\tau_{ind}=(L_{ind}\ M_{ind}\ N_{ind}\ F_{ind})^T$ for the aircraft, using axis dimensions, $L_{max}$, $M_{max}$, $N_{max}$, $F_{max}$, of the ellipsoid, in particular semi-axis dimensions of the ellipsoid; and d) Outputting at least the normalized control vector, $\tau_{ind}$, for determining a permissible flight maneuver in at least one dimension of the four-dimensional control volume.

19 Claims, 4 Drawing Sheets

(56) References Cited

U.S. PATENT DOCUMENTS

| | | | |
|---|---|---|---|
| 2011/0082604 | A1 | 4/2011 | Lam |
| 2011/0226892 | A1 | 9/2011 | Crowther et al. |
| 2015/0353191 | A1 | 12/2015 | Jolly et al. |
| 2020/0241567 | A1 | 7/2020 | Zwiener et al. |
| 2022/0001976 | A1* | 1/2022 | Iñaki ..................... B64C 27/20 |

FOREIGN PATENT DOCUMENTS

| | | |
|---|---|---|
| CN | 111348183 A | 6/2020 |
| CN | 109740288 B | 11/2020 |
| DE | 102010040770 | 3/2012 |
| DE | 102019101903 | 7/2020 |
| WO | 2012035025 A2 | 3/2012 |

* cited by examiner

METHOD FOR DETERMINING A
MANEUVERING RESERVE IN AN
AIRCRAFT, FLIGHT CONTROL DEVICE IN
AN AIRCRAFT AND APPROPRIATELY
EQUIPPED AIRCRAFT

INCORPORATION BY REFERENCE

The following documents are incorporated hereon by reference as if fully set forth: German Patent Application No. 10 2020 120 571.6, filed Aug. 4, 2020.

TECHNICAL FIELD

The invention relates to a method for determining a maneuvering reserve in an aircraft having a number of propulsion units, preferably in a vertical take-off and landing multirotor VTOL (Vertical Take-off and Landing) aircraft, most preferably an aircraft with electrically operated drive units for the rotors.

Furthermore, the invention relates to a flight control device in an aircraft having a number of propulsion units, preferably a vertical take-off and landing multirotor VTOL aircraft, most preferably an aircraft with electrically operated drive units for the rotors, which flight control device has a computing unit.

Finally, the invention also relates to an aircraft having a number of propulsion units, preferably a vertical take-off and landing multirotor VTOL aircraft, most preferably an aircraft with electrically operated drive units for the rotors.

BACKGROUND

Older rotary wing aircraft use indicators, for example FLI (First Limit Indicator), in order to, for example, indicate the performance required by the pilot or a currently applied power in relation to an available power or the required torque in relation to the available torque. This is carried out in the form of compressed representations of a number of parameters, wherein, however, only the most critical parameters are displayed, and this is for one or a maximum of two drive trains at the same time.

Previously known rotary wing aircraft focus on the display of power reserves, but not on the display of controllability reserves or maneuvering reserves. In this case, previously known aircraft in the form of helicopters or the like generate control torques for the aircraft by a tilting disc, while, for example, electrically operated VTOL aircraft (so-called eVTOL) generate the control torques by the propulsion units themselves, so-called LTUs (lift thrust units).

The controllability reserves or maneuverability reserves for eVTOL depend on the load capacity limits of the individual propulsion units (LTUs) and are therefore closely linked to each other in terms of the control torques. As a result, an effective load limit relative to one axis of the aircraft depends heavily on the current control requirements with respect to the other axes, which makes the evaluation and display of maneuvering reserves a non-trivial task.

In the case of aircraft, the corresponding control parameters are usually the total thrust and the control torques around three particular aircraft axes. As the person skilled in the art knows, the mentioned axes are usually the roll or longitudinal axis of the aircraft, the transverse or pitch axis of the aircraft and the vertical or yaw axis of the aircraft. In some cases, the axes are also referred to as the x-axis, y-axis and z-axis in the order mentioned. The English names are roll, pitch and yaw, in the present case the abbreviations L, M and N are also used for the corresponding (control) torques. For the total thrust, the abbreviation F is used in this case.

As a rule, the number of propulsion units of an eVTOL is relatively large, for example, it is 18 for the Volocopter® eVTOL from the company of the applicant. Therefore, the pilot cannot observe the load limits of the individual propulsion units at the same time and cannot directly influence them. There is therefore a need for a possibility to determine the available control limits or maneuvering reserves and to make them available in a manner that can be used by the pilot.

SUMMARY

Accordingly, the invention is based on the object of specifying a novel form of determination, preparation and if appropriate display of the available control limits or the maneuvering reserve, which instead of the limitations of individual propulsion units includes a novel form of detection of the four-dimensional maneuvering reserve, which may include in particular the consideration of control torques around the roll axis, the pitch axis and the yaw axis and the total thrust. The above-mentioned control torques around the individual axes are hereinafter also referred to simply as roll torque, pitch torque, yaw torque and total thrust.

The object is achieved according to the invention by a method having the one or more of the features disclosed herein, by a flight control device having one or more of the features disclosed herein, and by an aircraft having one or more of the features disclosed herein.

Advantageous developments of the idea according to the invention are defined below and in the claims.

A method according to the invention for determining a maneuvering reserve in an aircraft with a number of propulsion units, preferably a vertical take-off and landing multirotor VTOL aircraft, most preferably an aircraft with electrically operated propulsion units for the rotors, includes the steps: a) determination of a control vector, $\tau$, for the aircraft, $\tau=(L\ M\ N\ F)^T$, whose components represent control torques of the aircraft around the roll axis, L, the pitch axis, M, and the yaw axis, N, as well as a total thrust, F; b) approximating an existing four-dimensional control volume, D, of the aircraft by a four-dimensional ellipsoid, E, the axes of which represent the control torques, L, M, N, of the aircraft and the total thrust, F; c) determining a normalized control vector, $\tau_{ind}=(L_{ind}\ M_{ind}\ N_{ind}\ F_{ind})^T$, for the aircraft, using axis dimensions, $L_{max}$, $M_{max}$, $N_{max}$, $F_{max}$, of the ellipsoid, in particular semi-axis dimensions of the ellipsoid; and d) outputting at least the normalized control vector, $\tau_{ind}$, for determining a permissible flight maneuver in at least one dimension of the four-dimensional control volume.

The control volume, D, of the aircraft then represents the achievable range in $\tau$, i.e. that number of possible combinations of control torques and (total) thrust which can be generated by an aircraft and in particular by an eVTOL.

A flight control device or flight controller according to the invention in an aircraft having a number of propulsion units, preferably a vertical take-off and landing multirotor VTOL aircraft, preferably an aircraft with electrically operated drive units for the rotors, has a processor-based computing unit which is designed, in particular programmatically set up, for a) determining a control vector, $\tau$, for the aircraft, $\tau=(L\ M\ N\ F)^T$, the components of which represent control torques of the aircraft around the roll axis, L, the pitch axis, M, and the yaw axis, N, and a total thrust, F; b) approximating an existing four-dimensional control volume, D, of the aircraft by a four-dimensional ellipsoid, E, the axes of which represent the control torques, L, M, N, of the aircraft and the total thrust, F; c) determining a normalized control vector, $\tau_{ind}=(L_{ind}\,M_{ind}\,N_{ind}\,F_{ind})^T$, for the aircraft, using axis dimensions, $L_{max}$, $M_{max}$, $N_{max}$, $F_{max}$, of the ellipsoid, in particular semi-axis dimensions of the ellipsoid; and d) outputting at least the normalized control vector, $\tau_{ind}$, for determining a permissible flight maneuver in at least one dimension of the four-dimensional control volume.

An aircraft according to the invention having a number of propulsion units, preferably a vertical take-off and landing multirotor VTOL aircraft, most preferably an aircraft with electrically operated drive units for the rotors, is operated using the method according to the invention and/or has a flight control device according to the invention.

In this way, according to the invention, the mentioned coupling between the axes can be resolved by a novel normalization scheme for the control vector, which is based on the use of the ellipsoid mentioned above. In this way, in particular, when the output of the normalized control vector is used for the purpose of a display for the pilot, the use of fixed display limits per axis is enabled, although the effective control limits for each axis depend on the conditions with respect to the other axes. This allows, for an appropriate embodiment of the invention, in particular the intuitive and compact representation of the actual, present flight state with respect to the coupled (load) limits of the complex, redundant propulsion system.

As an example, an eVTOL with a plurality of in propulsion units can be considered, which propulsion units are used to generate the control torques and the total thrust. With an eVTOL, the number of propulsion units is typically greater than 4 to create redundancy in the propulsion system and to create a safety margin in relation to the loss and failure of individual propulsion units. As already mentioned, the Volocopter® has 18 propulsion units.

However, as can be seen from the claims, the scope of the present invention is by no means limited to eVTOL.

The individual thrust $u_i$ which each propulsion unit is able to provide has a lower limit $u_{min}$ and an upper limit $u_{max}$. For the entire propulsion system with all propulsion units, it is therefore possible to write: $\in U:=\{u\in R^m: u_{min}\leq u_i \leq u_{max}\}$. The relationship between the thrust of a single propulsion unit and the control vector, i.e. the control torques for the entire aircraft and the total thrust, is determined by a so-called control-effectiveness matrix (in short: control matrix), M on the basis of a linear relationship. Such a linear relationship is given in multirotor aircraft for example if the individual rotors cannot be pivoted. Since each propulsion unit is limited in its load capacity, the control torques for the entire aircraft and the total thrust are limited, according to $\tau\in D:=\{\tau\in R^4:\tau=Mu|u\in U\}$. Here, the term D is generally known as the control or regulation volume. For an eVTOL with linear mapping, this control or regulation volume takes the form of a so-called convex, four-dimensional polytope.

In geometry, a polytope is a generalized polygon in any dimension. One speaks of d-polytopes, where d is the dimension of the polytope. In certain dimensions, polytopes have been given special names, in particular point (dimension 0), distance (dimension 1), polygon (dimension 2), polyhedral (dimension 3) and polychoron (dimension 4). In convex polytopes, the special feature is that the connecting distance between any two points of the polytope is again completely contained in the polytope. Equivalently, such polytopes can be defined as a convex envelope of infinitely many points, for example of the vertices.

From a flight mechanical point of view, the control or regulation volume D, restricts the flight conditions that can be achieved or realized by the aircraft under consideration, for example an eVTOL. More precisely, a certain flight condition cannot be maintained (permanently) if the corresponding control vector, $\tau$, is not in the control or regulation volume. It is therefore important in practice to indicate to the pilot if a control command or the corresponding control vector is at the limits of the mentioned volume.

However, the specification of the vector mentioned with respect to the mentioned volume is complicated, since it is—as already explained—a four-dimensional volume with coupling between the axes, as shown for example in FIG. 1 (more detail below). In particular, the remaining maneuvering reserve, that is, the relative limits relative to each axis, depends on the current control requirements relative to the other axes; for example, a high thrust requirement limits the ability of the propulsion system to deliver control torques around the mentioned axes, and vice versa. As a specific example, let the pitch axis be mentioned, for example, since (inflight) torques around this axis are often significant in practice.

The output at least of the normalized control vector proposed in the context of the present invention can be used for the realization of a novel form of a control limit display, which comprises three indicators, which is shown in more detail below using the drawings. For example, this can be an indicator of the normalized total thrust, an indicator of the normalized yaw torque and another (common) indicator of the roll torque and the pitch torque.

In order to deal with the coupling between the axes, a particular normalization strategy is proposed—in the case of an appropriate embodiment of the invention—in which the values to be output or displayed are normalized depending on the control requirements with respect to the other axes. This allows the use of fixed display limits, especially in the range from −1 to +1, which take into account the axis coupling.

A first further development of the method according to the invention provides that in step a) for determining the control vector, the components of the control vector are commanded by a pilot, directly measured and/or determined on the basis of a physical model of the aircraft (for example from the individual thrust commands of the LTUs). Ultimately, the invention is not subject to any restriction as to where the components of the control vector determined in step a) originate. The only decisive factor at this point is that in the course of the method there is knowledge of which control requirements currently exist in relation to the aircraft. These control requirements, which represent the mentioned components of the control vector, are—as already stated—the control torques with regard to the roll, pitch and yaw axes as well as the total thrust.

In the course of another further development of the method according to the invention, it is provided that in step b) the axis dimensions of the ellipsoid are selected according to maximum permissible control torques, and a maximum permissible total thrust of the aircraft. In practice, it has proven to be advantageous if the mentioned axis dimensions of the ellipsoid are the corresponding semi-axes. Accordingly, the semi-axis indicates a lower limit of the corresponding control torques or the total thrust in one direction and a corresponding upper limit in the other direction.

Yet another development of the method according to the invention provides that in step b) the axis dimensions of the ellipsoid are determined from maximum permissible thrust values, $u_{min}$, $u_{max}$; $u_{min} \leq u \leq u_{max}$, of the individual propulsion units according to: $\tau \in D := \{\tau \in \mathbb{R}^4 : \tau = Mu\}$, with $\in U := \{u \in \mathbb{R}^m : u_{min} \leq u_i \leq u_{max}\}$, where in symbolizes the number of propulsion units, with $i=1, \ldots, m$, wherein $M \in \mathbb{R}^{4 \times m}$ is the control matrix, which is based on a linear relationship $\tau = M$ u.

It has been found to be particularly advantageous for the resulting outcome if in step c) all entries of the normalized control vector, $\tau_{ind}$, are determined in each case as a function of the total thrust, F.

In the same way, it has proved to be advantageous if in another further development of the method according to the invention in step c) the normalized control torque of the aircraft around the yaw axis, $N_{ind}$, is determined as a function of the determined total thrust, F.

It has been found to be particularly advantageous for the resulting outcome, when in step c) the normalized control torque of the aircraft around the roll axis, $L_{ind}$, and the normalized control torque of the aircraft around the pitch axis, $M_{ind}$, are determined in each case as a function of the determined total thrust, F, and as a function of the determined control torque of the aircraft around the yaw axis, $N_{ind}$.

The normalization is based on an approximate description of the control/regulation volume in the form of an ellipsoid, $E := \{\tau \in \mathbb{R}^4 : (\tau - \tau_0)^T Q (\tau - \tau_0) \leq 1\} \subset D$, which ellipsoid is the largest inscribed four-dimensional hyper-ellipsoid of the convex polytope, D, as shown below using the figures. The ellipsoid is a mathematical simplification (in the manner of a conservative estimate) of the mentioned convex polytope, which polytope represents the actual physical limits. The ellipsoid should—in order not to be too conservative—be "fitted" as well as possible into this polytope. The matrix $Q = \mathrm{diag}(L_{max}^2, M_{max}^2, N_{max}^2, F_{max}^2)$ contains, as already explained, the semi-axes for each control axis (roll axis, pitch axis, yaw axis), and $\tau_0 \in \mathbb{R}^4$ denotes the center of the ellipsoid. The applicant has found out that the result of the normalization in step c) can be used particularly effectively if the following relationships are used in step c) for the determination of the normalized control vector:

$$F_{ind} = \frac{F - F_0}{F_{max}};$$

$$N_{ind} = \frac{N - N_0}{N_{max}\sqrt{1 - F_{ind}^2}};$$

$$L_{ind} = \frac{L - L_0}{L_{max}\sqrt{1 - F_{ind}^2 - \frac{(N - N_0)^2}{N_{max}^2}}};$$

$$M_{ind} = \frac{M - M_0}{M_{max}\sqrt{1 - F_{ind}^2 - \frac{(N - N_0)^2}{N_{max}^2}}};$$

wherein the components of $\tau_0 \in \mathbb{R}^4$ are selected as values with index "0", which corresponds to the center of the ellipsoid. This expresses a particular embodiment of the present invention, which consists in normalizing the yaw torque or its possible display value as a function of the present thrust requirement. The (display) values for the roll torque and the pitch torque are accordingly normalized as a function of the current thrust requirement and yaw torque requirement.

For example, it can be assumed that a constant yaw torque $N > 0$ combined with a thrust requirement $F > F_0$ is present, which thrust requirement decreases over time. In this case, the displayed value of the yaw torque moves away from an upper display limit over time, as the relative limits for the yaw torque move further apart due to the thrust decrease (the maneuvering reserve becomes correspondingly larger).

Another possible further development of the method according to the invention provides that in step c) additionally a rate of change, in particular a rate of change against time, of the normalized control vector, $\dot{\tau}_{ind}$, or of its components, $\dot{F}_{ind}$, $\dot{L}_{ind}$, $\dot{M}_{ind}$, $\dot{N}_{ind}$, is determined and in step d) is at least partially output, for example to indicate future (hazard) situations to the pilot.

In order to make the output in step d) usable as well as possible, in particular for display purposes, an extremely preferred other development of the method according to the invention provides that in step d) the normalized control vector, $\tau_{ind}$, in the form of a data set with at least three data points is output, wherein i) a first data point indicates the normalized total thrust, $F_{ind}$, a second data point indicates the normalized control torque of the aircraft around the yaw axis, $N_{ind}$, and iii) a third data point indicates the normalized control torque of the aircraft around the roll axis, $L_{ind}$, as a function of the normalized control torque of the aircraft around the pitch axis, $M_{ind}$, or the normalized control torque of the aircraft around the pitch axis, $M_{ind}$, as a function of the normalized control torque of the aircraft around the roll axis, $L_{ind}$.

It has already been repeatedly pointed out that with appropriate further development of the method according to the invention it may be provided that the output in step d) can be carried out to a control device for the aircraft and/or to a display device, in particular for the pilot.

A first further development of the flight control device according to the invention provides that the computing unit therein is designed to carry out the method as defined in one of the dependent claims of the method and as described in detail above.

Another further development of the flight control device according to the invention provides that this additionally has a display device, such as a monitor or display screen, wherein the computing unit of the flight control device has a signaling connection to the display device. In this way, in particular, the output according to step d) of the method can be displayed for a pilot by means of the mentioned display device, so that the pilot can safely control the aircraft within the remaining maneuvering reserve.

However, the invention is by no means limited to the display of information; rather, the output according to step d) of the method can also be used to control the aircraft, if desired.

In the context of a corresponding further development of the invention, in particular the flight control device according to the invention, it is thus possible to use the above-defined distance metric within a flight control algorithm (directly) for controlling the aircraft. For this purpose, the normalized torques or the normalized thrust are traced back and taken into account in the choice of the control command. This is particularly interesting when path following algorithms are used and aerodynamic torques arise from the speed commanded by these algorithms which bring the aircraft to its limits which are still controllable. For airspeed control, it is therefore possible to use exactly the normalized torques defined further above in order to select the control command to be lower in the interests of safety and to deviate from the desired airspeed, which corresponds to so-called envelope protection.

In the context of a particularly preferred further development of the flight control device according to the invention, the display device may be designed to receive the normalized control vector, $\tau_{ind}$, from the computing unit and to display it, for which the display device preferably comprises three output segments, of which i) a first output segment has a first, one-dimensional scale for displaying the normalized total thrust, $F_{ind}$, ii) a second output segment has a second, one-dimensional scale for displaying the normalized control torque of the aircraft around the yaw axis, $N_{ind}$, and iii) a third output segment comprises a two-dimensional coordinate system, in particular a polar coordinate system, in order to display the normalized control torque of the aircraft around the roll axis, $L_{ind}$, as a function of the normalized control torque of the aircraft around the pitch axis, $M_{ind}$, or to display the normalized control torque of the aircraft around the pitch axis, $M_{ind}$, as a function of the normalized control torque of the aircraft around the roll axis, $L_{ind}$.

In another further development, the flight control device may comprise a pilot input unit, at least one sensor and/or a physical modeling unit, each of which is designed for determining the control vector, $\tau$, and its components, wherein the computing unit has a working connection to the mentioned pilot input unit, sensor and/or physical modeling unit.

BRIEF DESCRIPTION OF THE DRAWINGS

Further advantages and properties of the present invention result from the following description of exemplary embodiments based on the drawing.

DETAILED DESCRIPTION

Figure 1:
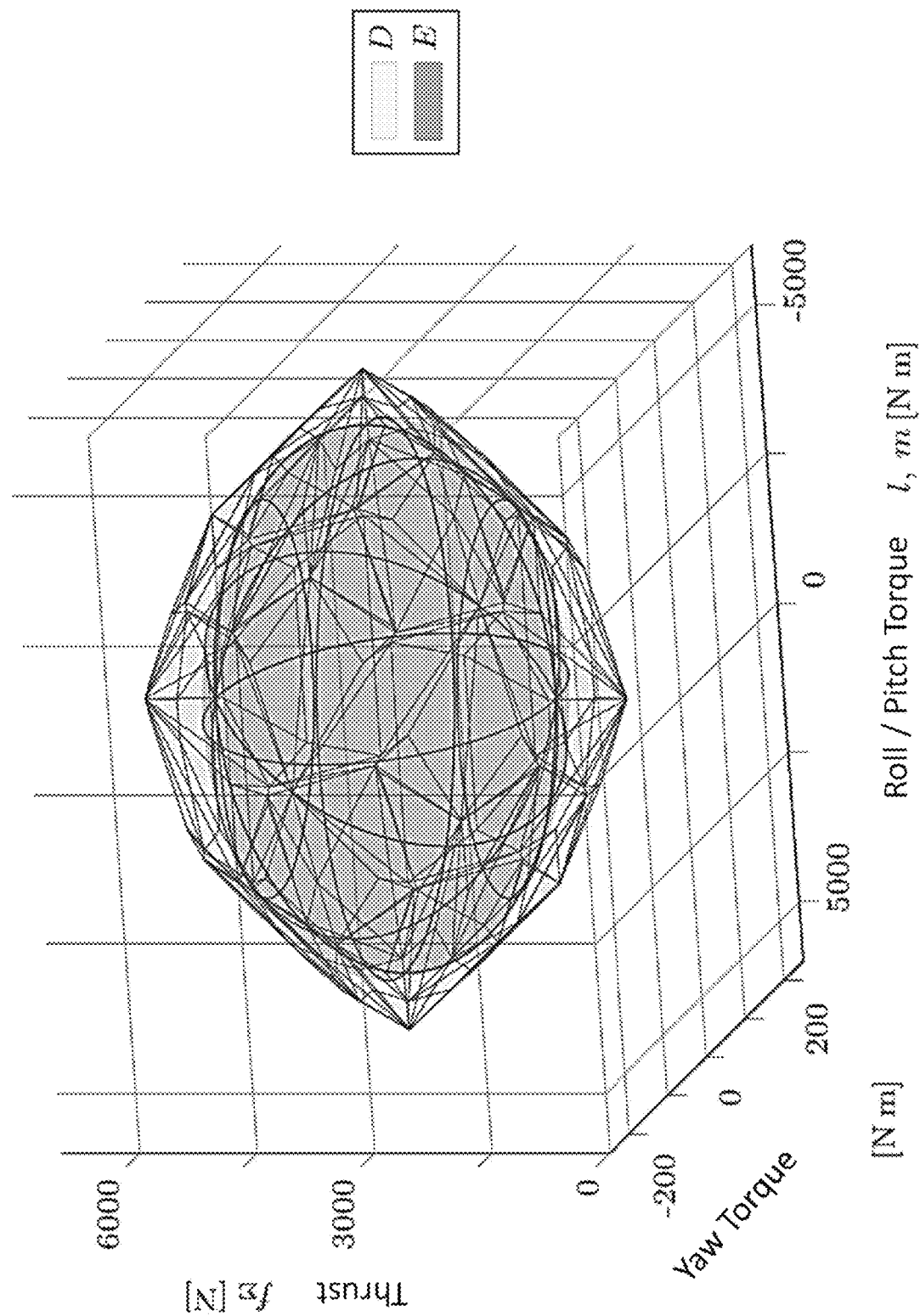
FIG. 1 shows the control/regulation volume and its approximate representation as an ellipsoid for a generic eVTOL in a three-dimensional projection.

In FIG. 1, the four-dimensional control/regulation volume, D, and its approximate representation as an ellipsoid, E, is shown in the form of a three-dimensional representation for a generic eVTOL. Vertically, the total thrust is plotted in units of Newtons. In the plane, the x-axis indicates the roll torque or the pitch torque (unit: Newton-meters), while the yaw torque is plotted perpendicularly to this (unit also Newton-meters). Reference character D in FIG. 1 denotes the convex polytope described at the beginning, while reference character E indicates the largest (hyper) ellipsoid which can be inscribed in the polytope. This ellipsoid is used in the context of the present invention as the basis for the described calculations or determinations.

Figure 2A:
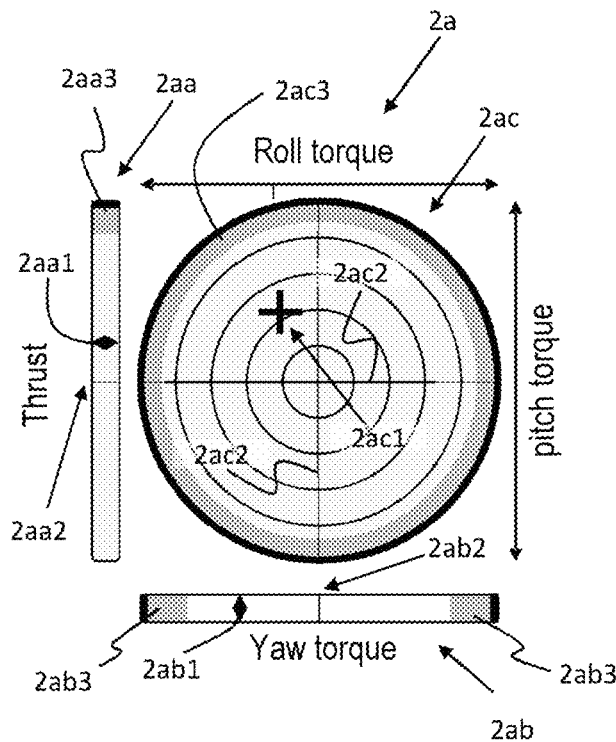
FIG. 2A shows an embodiment of the display device provided in the context of the flight control device according to the invention.

FIG. 2A shows a possible embodiment of the display device $2a$ (see FIG. 4), which can be used for displaying the values output according to step d) of the method.

According to FIG. 2A, the display device $2a$ has three different output segments $2aa$, $2ab$ and $2ac$. The first output segment $2aa$ is in the form of an essentially one-dimensional scale and is used to display the normalized total thrust. The second output segment $2ab$ is also in the form of a substantially one-dimensional scale and is used to display the normalized control torque of the aircraft around the yaw axis. The third output segment $2ac$ is in the form of a polar coordinate system for displaying the normalized control torque of the aircraft around the roll axis together with the normalized control torque of the aircraft around the pitch axis.

The display mentioned is carried out according to the exemplary embodiment in FIG. 2A for the first output segment $2aa$ in the form of a diamond-shaped output element $2aa1$ (without limitation), which moves along the scale depending on the value of the total thrust. The center marking line $2aa2$ shown corresponds to the value $F_0$. The upper, offset region $2aa3$ of the scale indicates that the maneuvering reserve in relation to the thrust is practically exhausted and accordingly directs the pilot to change his flying behavior if possible.

The output segment $2ab$ for the yaw torque is essentially formed according to the output segment $2aa$; however, there are marked areas $2ab3$ at both ends of the scale. Reference character $2ab1$ again denotes the display element (diamond-shaped), while reference character $2ab2$ denotes the mentioned center line.

The third output segment $2ac$ is formed in the manner shown as a type of target. The display element $2ac1$ is cross-shaped (without limitation), wherein the vertical and horizontal lines $2ac2$ correspond to the already mentioned center lines $2aa2$ and $2ab2$. The colored area $2ac3$ surrounds the entire third output segment $2ac$.

Figure 2B:
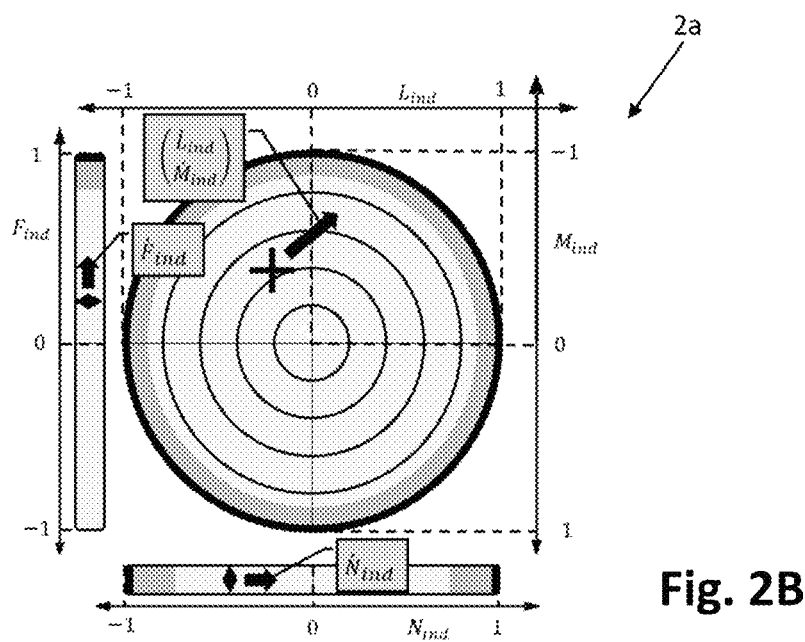
FIG. 2B shows a further development of the display device from FIG. 2A.

In FIG. 2B (without reference characters) in addition to FIG. 2A the respective range of values of the scales is shown. In addition, FIG. 2B comprises a number of solid black arrows, which are used in the manner shown to represent rates of change against time of the normalized control vector or its components, $\dot{F}_{ind}$, $\dot{L}_{ind}$, $\dot{M}_{ind}$, $\dot{N}_{ind}$, —in particular to indicate to the pilot the immediate consequences of his current flying behavior and possibly to cause a countermeasure before a disaster or an accident can occur.

Figure 3:
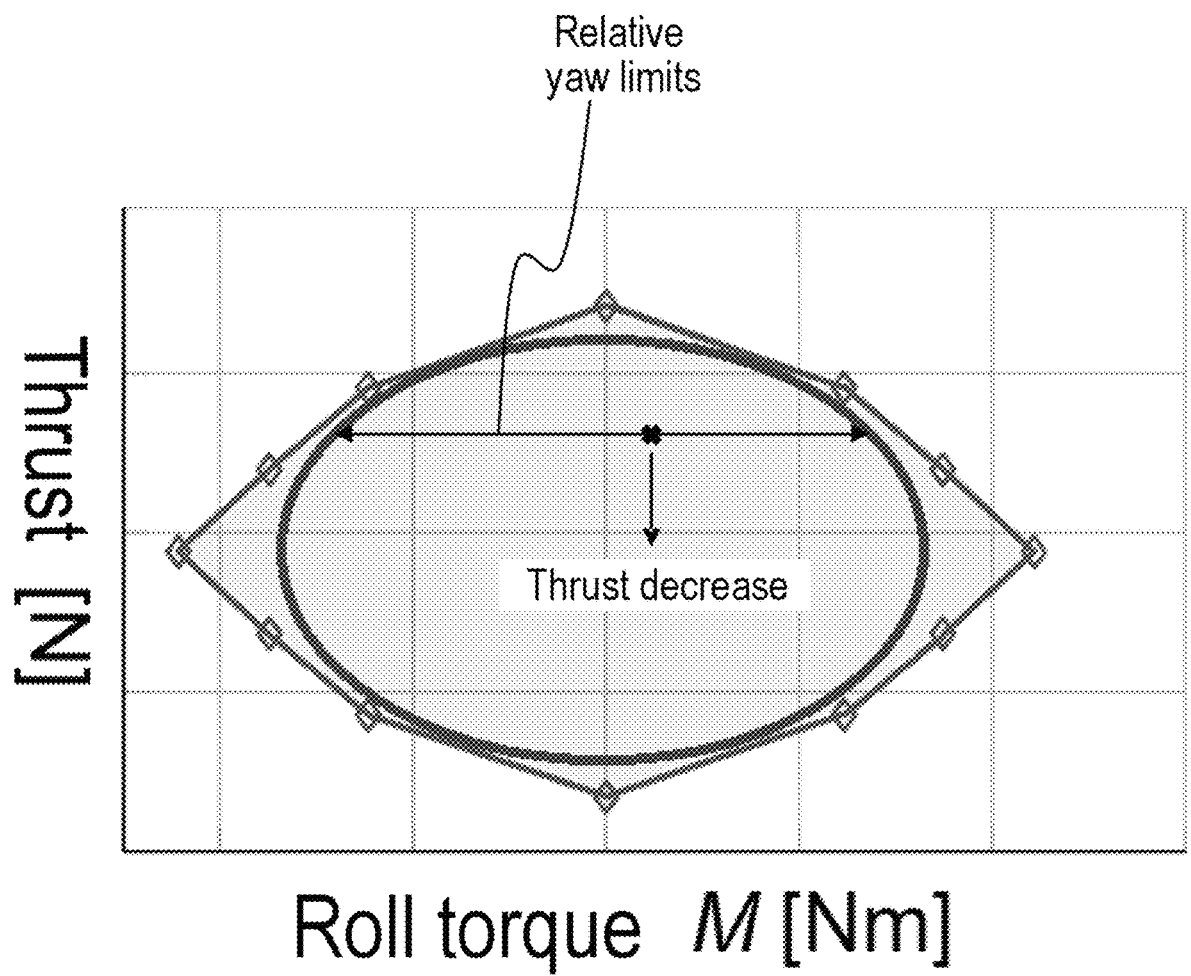
FIG. 3 shows a graphic representation to illustrate the relative limits mentioned in the introductory part in a two-dimensional representation.

How the relative limits mentioned in the introductory part of the description can behave due to the mentioned coupling, for example for the yaw torque, in the event of the change of the thrust requirement, is shown in FIG. 3 in a two-dimensional representation.

In FIG. 3, the outer polygon again represents the polytope, D, in accordance with FIG. 1; the inscribed ellipse represents the ellipsoid E shown in FIG. 1. When the thrust requirement decreases as shown (thrust decrease), the maneuvering reserve expands relative to the yaw torque (relative yaw limits), because the ellipsoid or polytope becomes wider in the direction of the thrust decrease.

Figure 4:
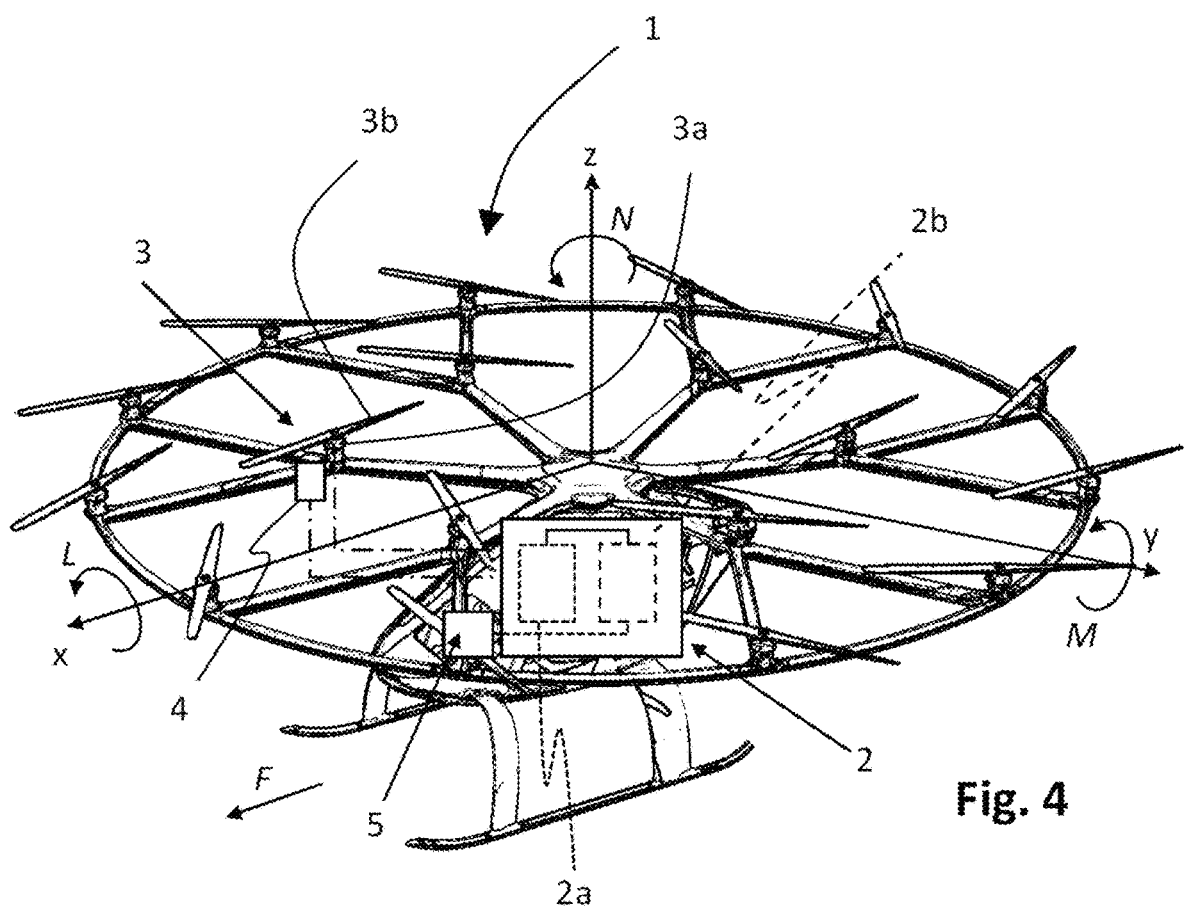
FIG. 4 shows a possible embodiment of the aircraft according to the invention.

Finally, FIG. 4 shows a possible embodiment of the aircraft according to the invention as a multirotor eVTOL 1 with 18 propulsion units 3 in the present case, of which only one is explicitly designated in FIG. 1. According to the illustration shown, each propulsion unit 3 comprises an electric motor $3a$ and a propeller $3b$. The propulsion units, in particular the propellers $3b$, are not pivotable according to the design of the aircraft 1 in FIG. 1, so that the linear relationship described above results.

The aircraft 1 has a flight control unit with reference character 2 designed according to the invention. The flight control unit 2 comprises in addition to the display unit $2a$, which has already been referred to above, a computing unit with reference character 2b, which is designed, preferably programmatically set up, in particular for carrying out the method according to the invention. Reference character 4 refers to an exemplary sensor; the aircraft 1 will usually comprise a large number of such sensors 4, which are in particular designed and suitable to determine a state of the aircraft 1 and in particular also the control vector. With reference character 5, a pilot input unit is shown, via which the pilot (not shown) transmits his control requirements to the aircraft 1, for example via a joystick or the like. The mentioned control vector can be determined or derived from this too. Alternatively or additionally, the flight control device 2 can use a physical model of the aircraft 1 for determining the control vector, which is not shown further in FIG. 4.

Preferably, the flight control unit 2 determines the normalized control vector by use of the computing unit 2b, as detailed above, and displays this to the pilot by the display device 2a, so that the pilot sees his maneuvering reserves at a glance and, if necessary, adjusts his flying behavior accordingly.

The invention claimed is:

1. A method for determining a maneuvering reserve in an aircraft with a number of propulsion unit, comprising the steps of:
    a) determining a control vector, $\tau$, for the aircraft, $\tau=(L\ M\ N\ F)^T$, components of which represent control torques L, M, and N of the aircraft around a roll axis, a pitch axis, and a yaw axis, respectively, and a total thrust, F;
    b) approximating an existing four-dimensional control volume, D, of the aircraft by a four-dimensional ellipsoid, E, axes of which represent the control torques, L, M, and N, of the aircraft and the total thrust, F;
    c) determining a normalized control vector, $\tau_{ind}=(L_{ind}\ M_{ind}\ N_{ind}\ F_{ind})^T$ for the aircraft, using axis dimensions, $L_{max}$, $M_{max}$, $N_{max}$, $F_{max}$, of the ellipsoid, $L_{ind}$, $M_{ind}$, $N_{ind}$, and $F_{ind}$ representing a normalized control torque of the aircraft around the roll axis, a normalized control torque of the aircraft around the pitch axis, a normalized control torque of the aircraft around the yaw axis, and a normalized total thrust, respectively;
    d) outputting at least the normalized control vector, $\tau_{ind}$, for determining a permissible flight maneuver in at least one dimension of the four-dimensional control volume; and
    e) controlling, using a flight controller or flight control device for the aircraft, the number of propulsion units of the aircraft to perform the permissible flight maneuver based at least in part on the normalized control vector, $\tau_{ind}$.

2. The method as claimed in claim 1, wherein the components of the control vector are commanded by a pilot, directly measured by a physical model of the aircraft, or determined by the physical model of the aircraft.

3. The method as claimed in claim 1, wherein in step b) the axis dimensions of the ellipsoid are selected according to maximum permissible control torques and a maximum permissible total thrust of the aircraft.

4. The method as claimed in claim 1, wherein in step b) the axis dimensions of the ellipsoid are determined from minimum and maximum permissible thrust values, $u_{min}$, $u_{max}$; $u_{min} \leq u \leq u_{max}$, of individual ones of the number of propulsion units according to:

$$\tau = D := \{\tau \in R^4 : \tau = Mu\}, \text{ with}$$

$$u \in U := \{u \in R^m : u_{min} \leq u_i \leq u_{max}\},$$

where u symbolizes thrust values, $u_i$ symbolizes thrust values of the individual ones of the number of propulsion units, U symbolizes a total thrust for the number of propulsion units, m symbolizes the number of propulsion units, with $i=1, \ldots, m$, wherein $M \in R^{4 \times m}$ is a control-effectiveness matrix based on a linear relationship $\tau = Mu$.

5. The method as claimed in claim 1, wherein in step c) all entries of the normalized control vector, $\tau_{ind}$, are each determined depending on the total thrust, F.

6. The method as claimed in claim 1, wherein in step c) the normalized control torque of the aircraft around the yaw axis, $N_{ind}$, is determined as a function of the total thrust, F.

7. The method as claimed in claim 1, wherein in step c) the normalized control torque of the aircraft around the roll axis, $L_{ind}$, and the normalized control torque of the aircraft around the pitch axis, $M_{ind}$, are each determined as a function of the total thrust, F, and as a function of the normalized control torque of the aircraft around the yaw axis, $N_{ind}$.

8. The method as claimed in claim 1, wherein in step c) for the determination of the normalized control vector, $\tau_{ind}$, the following relationships are used:

$$F_{ind} = \frac{F - F_0}{F_{max}};$$

$$N_{ind} = \frac{N - N_0}{N_{max}\sqrt{1 - F_{ind}^2}};$$

$$L_{ind} = \frac{L - L_0}{L_{max}\sqrt{1 - F_{ind}^2 - \frac{(N - N_0)^2}{N_{max}^2}}};$$

$$M_{ind} = \frac{M - M_0}{M_{max}\sqrt{1 - F_{ind}^2 - \frac{(N - N_0)^2}{N_{max}^2}}};$$

wherein components of $\tau_0 \in R^4$ are selected as values with index "0", which corresponds to a center point of the ellipsoid.

9. The method as claimed in claim 1, wherein in step d) the normalized control vector, $\tau_{ind}$, is output as a data set having at least three data points, wherein
   i) a first data point indicates the normalized total thrust, $F_{ind}$;
   ii) a second data point indicates the normalized control torque of the aircraft about the yaw axis, $N_{ind}$; and
   iii) a third data point indicates the normalized control torque of the aircraft around the roll axis, $L_{ind}$, as a function of the normalized control torque of the aircraft around the pitch axis, $M_{ind}$, or indicates the normalized control torque of the aircraft around the pitch axis, $M_{ind}$, as a function of the normalized control torque of the aircraft around the roll axis, $L_{ind}$.

10. The method as claimed in claim 1, wherein in step c) additionally a rate of change of the normalized control vector, $\dot{\tau}_{ind}$, or of components, $\dot{F}_{ind}$, $\dot{L}_{ind}$, $\dot{M}_{ind}$, $\dot{N}_{ind}$ thereof, is determined and is at least partially output in step d).

11. The method as claimed in claim 1, wherein the output in step d) is output to a display device.

12. The method as claimed in claim 1, wherein the aircraft is a vertical take-off and landing multirotor VTOL aircraft, with electrically operated drive units for rotors.

13. A flight controller in an aircraft with a number of propulsion units, the flight controller comprising a computing unit which is configured for:
  a) determining a control vector, $\tau$, for the aircraft, $\tau=(L\ M\ N\ F)^T$, components of which represent control torques L, M, and N of the aircraft around a roll axis, a pitch axis, and a yaw axis, respectively, and a total thrust, F;
  b) approximating an existing four-dimensional control volume, D, of the aircraft by a four-dimensional ellipsoid, E, axes of which represent the control torques, L, M, and N, of the aircraft and the total thrust, F;
  c) determining a normalized control vector, $\tau_{ind}=(L_{ind}\ M_{ind}\ N_{ind}\ F_{ind})^T$, for the aircraft, using axis dimensions, $L_{max}, M_{max}, N_{max}, F_{max}$ of the ellipsoid, $L_{ind}, M_{ind}, N_{ind},$ and $F_{ind}$ representing a normalized control torque of the aircraft around the roll axis, a normalized control torque of the aircraft around the pitch axis, a normalized control torque of the aircraft around the yaw axis, and a normalized total thrust, respectively;
  d) outputting at least the normalized control vector, $\tau_{ind}$, for determining a permissible flight maneuver in at least one dimension of the four-dimensional control volume; and
  e) controlling the number of propulsion units of the aircraft to perform the permissible flight maneuver based at least in part on the normalized control vector, $\tau_{ind}$.

14. The flight controller as claimed in claim 13, wherein the computing unit is further configured such that, for determining the control vector, $\tau$, the components of the control vector are adapted to be commanded by a pilot, directly measured by a physical model of the aircraft, or determined by the physical model of the aircraft.

15. The flight controller as claimed in claim 13, wherein the flight controller further comprises a display device with a signaling connection to the computing unit.

16. The flight controller as claimed in claim 15, wherein the display device is configured to receive, from the computing unit, and display the normalized control vector, $\tau_{ind}$, and comprises three output segments, of which
  i) a first output segment has a first, one-dimensional scale in order to display the normalized total thrust, $F_{ind}$;
  ii) a second output segment has a second, one-dimensional scale in order to display the normalized control torque of the aircraft around the yaw axis, $N_{ind}$; and
  iii) a third output segment comprises a two-dimensional coordinate system in order to display the normalized control torque of the aircraft around the roll axis, $L_{ind}$, as a function of the normalized control torque of the aircraft around the pitch axis, $M_{ind}$, or to display the normalized control torque of the aircraft around the pitch axis, $M_{ind}$, as a function of the normalized control torque of the aircraft around the roll axis, $L_{ind}$.

17. The flight controller as claimed in claim 13, wherein the aircraft is a vertical take-off and landing multi-rotor VTOL aircraft, with electrically operated drive units for rotors.

18. An aircraft, comprising:
  a number of propulsion units; and
  a processor configured to:
  a) determine a control vector, $\tau$, for the aircraft, $\tau=(L\ M\ N\ F)^T$, components of which represent control torques L, M, and N of the aircraft around a roll axis, a pitch axis, and a yaw axis, respectively, and a total thrust, F;
  b) approximate an existing four-dimensional control volume, D, of the aircraft by a four-dimensional ellipsoid, E, axes of which represent the control torques, L, M, and N, of the aircraft and the total thrust, F;
  c) determine a normalized control vector, $\tau_{ind}=(L_{ind}\ M_{ind}\ N_{ind}\ F_{ind})^T$, for the aircraft, using axis dimensions, $L_{max}, M_{max}, N_{max}, F_{max}$ of the ellipsoid, $L_{ind}, M_{ind}, N_{ind},$ and $F_{ind}$ representing a normalized control torque of the aircraft around the roll axis, a normalized control torque of the aircraft around the pitch axis, a normalized control torque of the aircraft around the yaw axis, and a normalized total thrust, respectively;
  d) output at least the normalized control vector, $\tau_{ind}$, for determining a permissible flight maneuver in at least one dimension of the four-dimensional control volume; and
  e) control the number of propulsion units of the aircraft to perform the permissible flight maneuver based at least in part on the normalized control vector, $\tau_{ind}$.

19. The aircraft of claim 18, wherein the aircraft is a vertical take-off and landing (VTOL) multi-rotor aircraft with electrically operated drive units for rotors.

* * * * *